United States Patent [19]

Liberatoscioli

[11] Patent Number: 5,303,471
[45] Date of Patent: Apr. 19, 1994

[54] ATTACHMENT ARRANGEMENT FOR RECIPROCATING POWER SAW

[76] Inventor: Dante Liberatoscioli, 38 Greentree La., Malvern, Pa. 19355

[21] Appl. No.: 910,639
[22] Filed: Jul. 8, 1992
[51] Int. Cl.⁵ .............................................. B25F 3/00
[52] U.S. Cl. ........................................ 30/122; 30/371; 30/388; 83/750; 83/886
[58] Field of Search ................. 30/122, 371, 505, 388; 83/750, 886, 823, 881, 834

[56] References Cited

U.S. PATENT DOCUMENTS

| | | | |
|---|---|---|---|
| 1,313,054 | 8/1919 | Berry | 83/886 |
| 2,492,156 | 12/1949 | Kupjack | 30/166.3 |
| 3,091,851 | 6/1963 | Cummins | 30/167 |
| 3,505,733 | 4/1970 | Holden | 30/166.3 |
| 3,952,412 | 4/1976 | Rhodes | 30/166.3 |
| 4,361,956 | 12/1982 | Kirk | 30/122 |
| 4,637,391 | 1/1987 | Schlein | 30/388 |
| 4,972,589 | 11/1990 | Povleski | 30/500 |
| 5,014,430 | 5/1991 | Wortham | 30/166.3 |
| 5,042,334 | 8/1991 | Nygards | 30/103 X |
| 5,160,340 | 11/1992 | Gary et al. | 83/881 X |

OTHER PUBLICATIONS

1990 *Tools on Sale*, catalog, pp. 183-192 (month unknown).

*Primary Examiner*—Richard K. Seidel
*Assistant Examiner*—Kenneth E. Peterson
*Attorney, Agent, or Firm*—Connolly & Hutz

[57] ABSTRACT

An attachment arrangement is described which converts the reciprocal motion of a reciprocal saw into oscillatory cutting motion of a circular blade. The circular blade is provided between circular sleeves, which limit the depth to which the blade can cut into a substrate. Using this arrangement, wallboard may be cut without reaching studs, wires or pipes situated behind the wallboard.

8 Claims, 2 Drawing Sheets

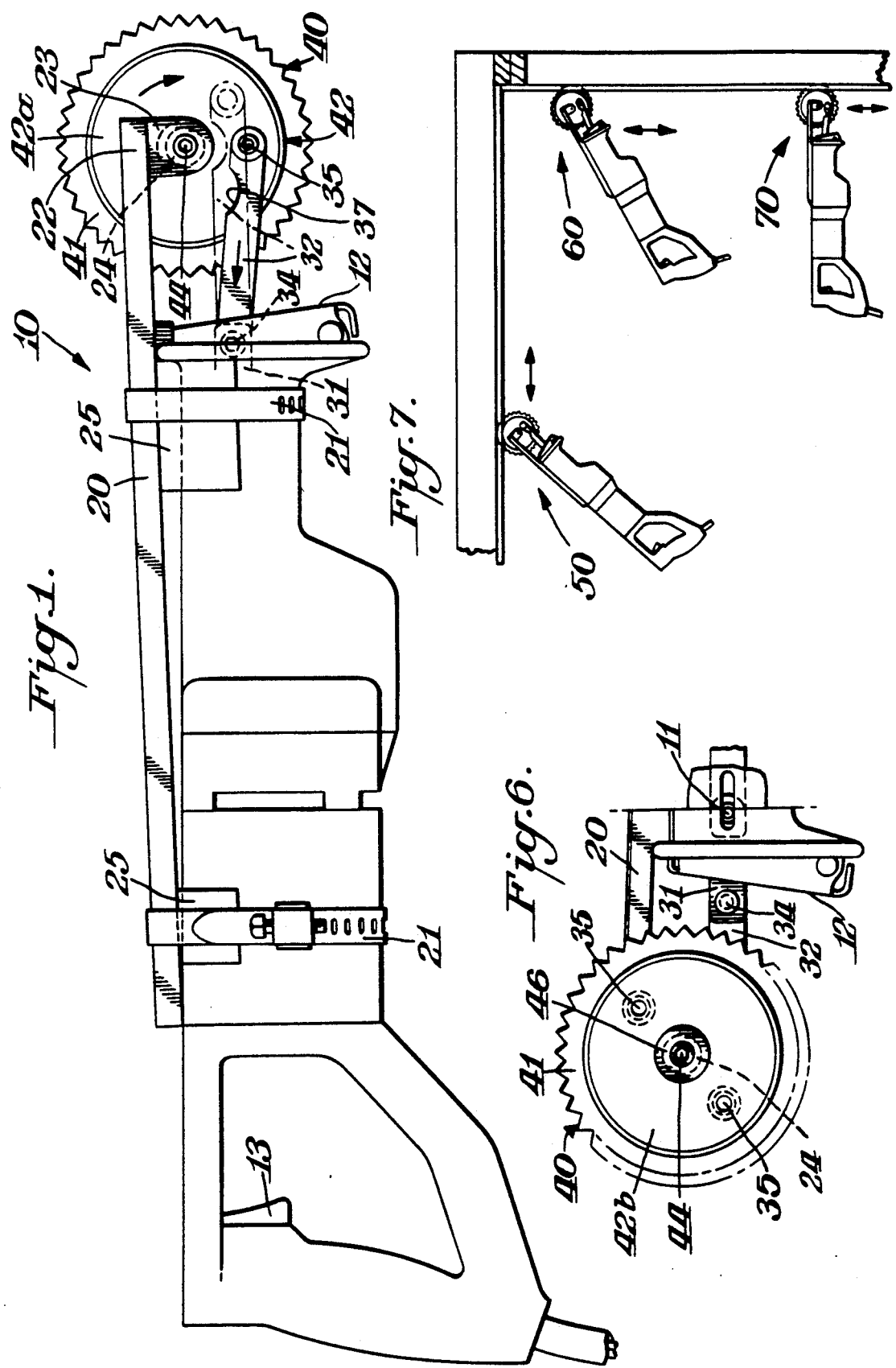

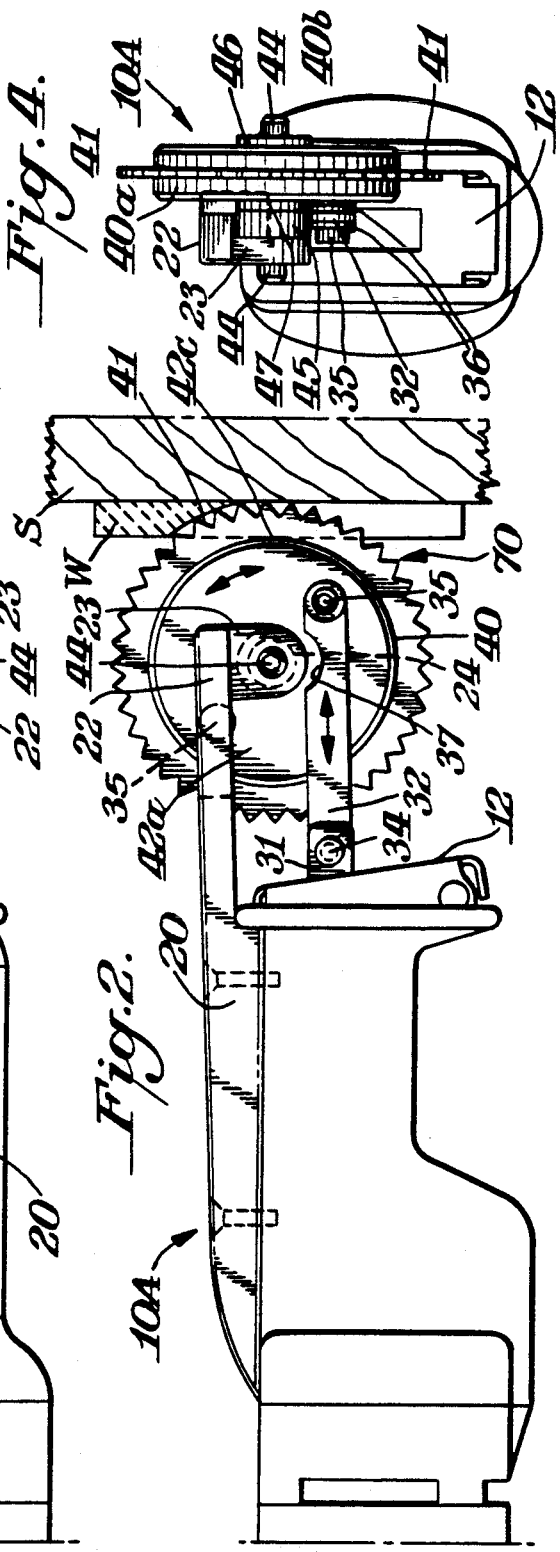

ATTACHMENT ARRANGEMENT FOR RECIPROCATING POWER SAW

FIELD OF THE INVENTION

The invention relates to the field of power tools, and in particular, to modification of reciprocating power saws. More particularly, the invention relates to an attachment arrangement for reciprocating saws which converts the reciprocating motion of the saw to an oscillatory rotary cutting motion, thus expanding the utility and versatility of the reciprocating saw, particularly in remodeling or renovation work.

BACKGROUND OF THE INVENTION

When doing renovation work, it is often necessary to make cutouts in either plaster or drywall (wallboard) walls. In many instances, the worker is unaware whether or not there are water pipes, gas pipes, or electrical or phone wires in the wall where the cutout is to take place. The normal and most cautious approach, therefore, is to make the cutout using hand tools such as a utility knife or keyhole saw. Such cutting is a difficult and tedious aspect of renovation work. If such cutting is attempted with a power tool, such as a reciprocating saw, however, there is a risk that the blade will cut deeply through the wall material and into the cavity of the wall where pipes, wires or studs are located, causing damage or danger. Reciprocating saws have a powerful, aggressive cutting action which is difficult to control. Thus, before attempting to cut with a reciprocating saw, the pipes, studs and wires behind the wall must normally be located by careful hand cutting.

Moreover, there are other problems in using a reciprocating saw for this type of cutting. For example, there is a lack of stability when making starting or "plunge" cuts into the material being cut. The saw blade has a tendency to whip from side to side when not engaged with the wall material, which can cause unwanted damage to paint or wallcoverings as the plunge cut is made. There is also a risk that, on a forward cutting stroke, the saw blade could hit on an unyielding object and cause the saw to jump suddenly and violently. It is also difficult to keep the saw blade accurately on a cut line when making a cut, particularly when the cut line crosses over a stud or joist or runs longitudinally over a stud or joist, where the blade is continuously striking the stud or joist causing the machine to "kick back" in the hands of the operator. It is not unusual to break the blade of a reciprocating saw when making this type of cut.

Lastly, the operator is limited in the positions and orientations in which a reciprocating saw can be used to make a cut. When using conventional reciprocating saws, the operator can install the blade in two possible positions, either right side up or upside down. To go from one position to the other, the blade must be changed to the new position. A cut may be made only in the direction of the blades' teeth, which is usually towards the operator. As noted, there is no way to accurately control the depth of the cut. A need therefore exists to improve the versatility and safety, and to accurately control the depth of cutting, of a conventional reciprocating saw.

Many devices shown in the prior art are capable of rotary cutting action using a circular blade. It has also been suggested to modify certain power tools to accomplish different additional functions. For example, U.S. Pat. No. 4,361,956 to Kirk shows modification of a saber saw to provide oscillating motion to a blade.

Insofar as is known, it has not been suggested in the art to modify a reciprocating saw to expand its versatility and overcome the difficulties described above.

SUMMARY OF THE INVENTION

The invention relates to an attachment arrangement for reciprocating motor driven power saws, which attachment arrangement converts the reciprocating motion of the saw which normally reciprocates the blade to an oscillatory cutting motion. A support arm is provided which is affixed to the housing of the reciprocating saw and extends outwardly in front of the saw. A circular saw blade arrangement is rotatably mounted to the support arm, such that the circular saw blade arrangement is positioned in front of the saw. A hinged arm interconnects the blade attachment lock site on the saw with the circular saw blade arrangement such that, when the power of the reciprocating saw is activated, the reciprocal motion is converted into back and forth oscillatory motion of the circular saw blade arrangement.

The circular saw blade arrangement includes a circular saw blade and means defining a predetermined cutting depth to which the blade can enter a cuttable substrate. In preferred form, the circular saw blade is sandwiched between two disk-shaped circular sleeve members, and is locked to the sleeve members such that the saw blade and the sleeve members rotate together. The circular sleeve members preferably have the same diameter as each other which is smaller than the diameter of the circular saw blade. The difference in diameter between the circular saw blade and the sleeves defines the predetermined cutting depth, which can be matched to the thickness of the wallboard or other substrate being cut. The sleeve means may be easily removable to facilitate changing to a different size of circular saw blade.

Using the described arrangement, it is possible to cut into a cuttable substrate to a predetermined depth, which permits rapid and safe cutting of wallboard and the like, without concern as to cutting or damaging pipes, wires or studs which may be located behind the wallboard.

BRIEF DESCRIPTION OF THE DRAWINGS

FIG. 1 is a left side elevational view of a reciprocating power saw shown in combination with a preferred embodiment of the attachment arrangement of the invention.

FIG. 2 is a partial left side elevational view of a reciprocating power saw in combination with another preferred embodiment of the attachment arrangement, shown cutting into wallboard.

FIG. 3 is a top plan view of the embodiment shown in FIG. 2.

FIG. 4 is a front elevational view of the embodiment of FIG. 2.

FIG. 5 is a bottom plan view of the embodiment of FIG. 2.

FIG. 6 is a partial right side elevational view of the embodiment of FIG. 2.

FIG. 7 is a diagrammatic view of the embodiment of FIG. 2 showing ways it may be positioned during use.

DETAILED DESCRIPTION OF THE INVENTION

Reciprocating power saws are well known to those skilled in the art of carpentry and construction. Such saws typically comprise an outer housing including a handle, a single or variable speed electric drive motor, and a removable blade, which is usually 6-12 inches in length. The blade inserts into a blade insertion site on the saw, which comprises a blade lock mechanism near the front face of the saw. The action of the motor rapidly reciprocates the blade lock and the blade held therein to provide the cutting action. Representative saws of this type now in use are the Milwaukee Sawzall, Makita Recipro Saw, Porter Cable Tiger Saw, Bosch Panther, Black and Decker Cut Saw, the AEG Sabre Tooth and the Rockwell saws. It should be appreciated that the attachment arrangement described herein can be adapted to fit any conventional or available reciprocating saw. Saws or tools with a reciprocating action but which differ substantially in operation and intended use from the above, such as saber saws, are not embraced by the term "reciprocating saw" as used herein.

Referring to the drawings, the currently preferred embodiment of the attachment arrangement of the invention will be described in more detail. A conventional reciprocating saw of the type described above, with the blade removed, is shown in combination with the attachment arrangement at numeral 10 in FIG. 1 and 10A in FIGS. 2 and 3. The housing of saw 10 has a front face 12 and a blade attachment site in the form of blade lock 11 (see FIG. 6). It will be appreciated from the saw operation that when the saw is activated by depressing the trigger 13 the blade lock 11 rapidly reciprocates back and forth with respect to the front face of the saw.

Affixed rigidly to the housing of the saw, preferably on its upper surface, is a support arm 20. The support arm 20 is firmly and nonmovably affixed to the housing of the saw by any suitable means, for example, using hose clamps 21 (FIG. 1) or screws 21A (FIGS. 2 and 3). The support arm can be positioned with respect to the saw housing using spaces 25, if necessary. Other means of attaching the support arm to the saw would be equally satisfactory, provided that the support arm is rigidly affixed to the saw. For example, the saw housing and the support arm could have integrally formed locking means, such that the support arm locked directly into the saw housing without additional locking parts being required. Optionally, the support arm could be molded integrally with the saw housing.

The support arm 20 projects outwardly from the front face 12 of the saw. Attached rotatably to the front end 22 of the support arm 20 is circular saw blade arrangement 40. The end of the support arm 22 may include a downwardly extending tab 23 with an opening (not shown) into which the circular saw blade arrangement is rotatably mounted. The distance between the circular saw blade arrangement and the front of the saw is not critical, but should preferably be kept to a minimum, consistent with the manner of operation described below.

The circular saw blade arrangement 40 comprises a circular saw blade 41 and at least one sleeve 42. The sleeve is disk-shaped, has a smaller diameter than the circular blade, and has a substantially flat outer edge 42C. Preferably two identical sleeves are used, which are positioned on opposite surfaces of the circular saw blade to sandwich the blade therebetween. So arranged, the blade and the sleeves share a common, concentric center. Sleeve bolts 35 pass through suitable openings in the blade and sleeves to assure that the sleeves and blade are locked and rotate together as an integral unit, held together at the rotational center by bushing 45 and retaining pin 44.

The circular saw blade arrangement as described rotates about axle 24, shown in phantom in FIGS. 1, 2, 5, and 6, which is positioned to extend from one side of the support arm 20 through the opening therein to the other side of the support arm. Thus, the axle affixes the saw blade arrangement rotatably at the outer end 22 of the support arm 20. Optional spacers 46 and 47 may be included to properly distance the spinning blade from the support arm. As described, the entire circular saw blade arrangement is freely rotatable around the axle 24.

A hinged arm means is provided to functionally connect the blade attachment site of the saw to the circular saw blade arrangement and thus transfer power from the saw to the attachment arrangement. Preferably a two-part hinged arm means is provided, which consists of first hinge component 31 and second hinge component 32, the two components of the hinge being pivotally attached to one another at hinge joint 34. Hinge component 31 is adapted to fit into the saw blade lock of the saw, in essentially the same locking manner that a saw blade would be attached. Second hinge component 32 is attached to the circular saw blade arrangement, in such a manner that the reciprocal motion of the saw is converted, via the hinged arm means, to oscillatory motion of the circular saw blade arrangement. This may be accomplished by pivotally affixing the second hinge component 32 to one of the sleeve members 42. The second hinge component 32 is pivotally affixed to the sleeve member using bolt 35 and bushings 36. As shown in the drawings, the point of attachment of the hinge component 32 to the sleeve 42 is offset from the central rotation point of the circular saw blade and sleeves. In this manner, the back and forth reciprocal motion of the saw is converted to back and forth oscillatory motion of the circular saw blade. If necessary, a depression 37 (see FIGS. 1 and 2) may be provided in hinge member 32 to avoid contact between the hinge and the support arm or tab portion 23 thereof. In FIG. 1, the inward position of a reciprocal stroke is shown in full, and the outer position of a stroke is shown in phantom. In the particular arrangement shown, the depression 37 in second hinge component 32 avoids contact between the hinge and tab 23 of the support arm.

As shown in the drawings, the two support sleeves are preferably circular and disk-shaped. Each sleeve 42 is smaller in diameter than the circular saw blade 41, and preferably the two sleeves have the same diameter. In this manner, when the sleeves and saw blade are arranged as described, only a predetermined amount of the saw blade is exposed, which defines a predetermined cutting depth to which the circular blade will cut before the sleeves contact the surface being cut. As will be apparent, the sleeves preclude a deeper cut when surfaces 42c of the sleeves abut the surface being cut. The blade and/or sleeves can be changed or replaced as necessary to achieve any desired cutting depth. For example, if one inch wallboard is to be cut, the amount of exposed blade is one inch. To cut to a different depth, the blade and/or sleeve is changed. In a preferred arrangement, the sleeve 42a closest to the support arm is semipermanently affixed to the saw, whereas the other, outer sleeve 42b is more easily removable. In this manner, the blade can be changed by removing only one of the two sleeves. When a different size blade is added, the outer sleeve 42b can also be replaced, to define a new cutting depth equal to or lesser than the depth defined by the inner sleeve.

In operation, the operator selects the predetermined sawing depth by selection of blade and sleeves of the appropriate sizes. The reciprocating saw is actuated to the desired speed. The reciprocating motion of the saw is converted via the hinged arm means to the circular saw blade arrangement, in the form of rapid oscillating movement.

Using the attachment as described in combination with a reciprocating saw, a number of important advantages can be realized. It should be evident that virtually any predetermined cutting depth of practical significance can be consistently and readily achieved. Cutting of wallboard or plaster during remodeling can progress unhindered by concern for pipes, wires or studs behind the wall being cut. As seen in FIG. 2, the amount of exposed blade is tailored to the depth of the wallboard (w) being cut, and the cut does not reach the stud (S) located behind the wall. The time-saving and safety benefits achieved in remodeling are thus substantial. Starting or "plunge" cuts into wall surfaces are greatly facilitated, and cut line accuracy is much easier to maintain than when using a conventional reciprocating saw. Cuts can be made in a direction towards or a direction away from the operator with equal facility. As shown in FIG. 7, a cut can be made using any exposed portion of the circular blade, such as top edge in position 50, the front/lower edge as in position 60, or the front edge as in position 70, allowing cutting of floors, walls and also ceilings due to the flexibility of positioning the saw with the attachment arrangement in place. The reciprocating motion of the blade throws dust less violently than does a unidirectional circular cutting motion.

Having thus described the invention in its currently preferred form, which is intended as illustration and not as limitation, the invention is claimed as follows.

What is claimed is:

1. An attachment arrangement for a motor-driven reciprocating saw having a front face and a blade-attachment site, to adapt the saw for oscillatory circular cutting to a predetermined depth into a cuttable substrate, the attachment arrangement comprising:
   a support arm rigidly attachable to the saw to extend outwardly from the front face of the saw;
   a circular saw blade arrangement rotatably mounted to the support arm to position the circular saw blade arrangement outwardly from the front face of the saw;
   hinged arm means having a first end attachable to the blade attachment site of the saw and a second end attached to the circular saw blade arrangement such that the reciprocating motion of the saw is converted to oscillating motion of the circular saw blade arrangement;
   and wherein the circular saw blade arrangement comprises a circular saw blade and at least one disk-shaped circular sleeve member, the circular sleeve member having a diameter less than the diameter of the circular saw blade, the difference in diameter between the circular sleeve member and the circular saw blade defining the predetermined cutting depth, and wherein the second end of the hinged arm means is affixed to the circular sleeve member to rotate the circular sleeve member and the circular saw blade as an integral unit.

2. The attachment arrangement of claim 1 wherein the circular saw blade arrangement includes two disk-shaped circular sleeve members of equal diameter affixed to opposite surfaces of the circular saw blade.

3. The attachment arrangement of claim 2 wherein the two circular sleeve members and the circular saw blade are arranged concentrically and share a common center which is the point of rotatable attachment of the circular saw blade arrangement to the support arm.

4. The attachment arrangement of claim 3 wherein the second end of the hinged arm means is pivotally attached to one of the circular sleeve members at a point offset from the common center.

5. The attachment arrangement of claim 4, wherein the hinged arm means comprises a two-component hinge, the two parts being pivotally connected at a hinge joint, and wherein the first hinge component is attachable to the blade attachment site of the saw, and the second hinge component is attachable to one of the circular sleeve members.

6. The attachment arrangement of claim 5, wherein the second hinge component is provided with a depression to avoid contact between the hinged arm means and the support arm.

7. In combination with a motor-driven reciprocating saw having a front face, an attachment arrangement for oscillatory circular cutting into a cuttable substrate, the attachment arrangement comprising:
   a support arm rigidly attached to the surface of the saw housing to extend outwardly from the front face of the saw;
   a circular saw blade arrangement rotatably mounted to the support arm to position the entire circular saw blade arrangement outwardly from the front face of the saw;
   hinged arm means having a first end attached to the blade attachment site of the saw and a second end attached to the circular saw blade arrangement such that the reciprocating motion of the saw is converted to oscillating motion of the circular saw blade arrangement;
   and wherein the circular saw blade arrangement comprises a circular saw blade and at least one circular sleeve member having a diameter less than the diameter of the circular saw blade, the difference in diameter between the circular sleeve member and the circular saw blade defining a predetermined cutting depth the second end of the hinged arm means being affixed to the sleeve member to rotate the sleeve member and the circular saw blade as an integral unit.

8. The combination of claim 7, wherein the circular saw blade arrangement comprises two sleeve members affixed to opposite surfaces of the circular saw blade.

* * * * *